Patented June 10, 1941

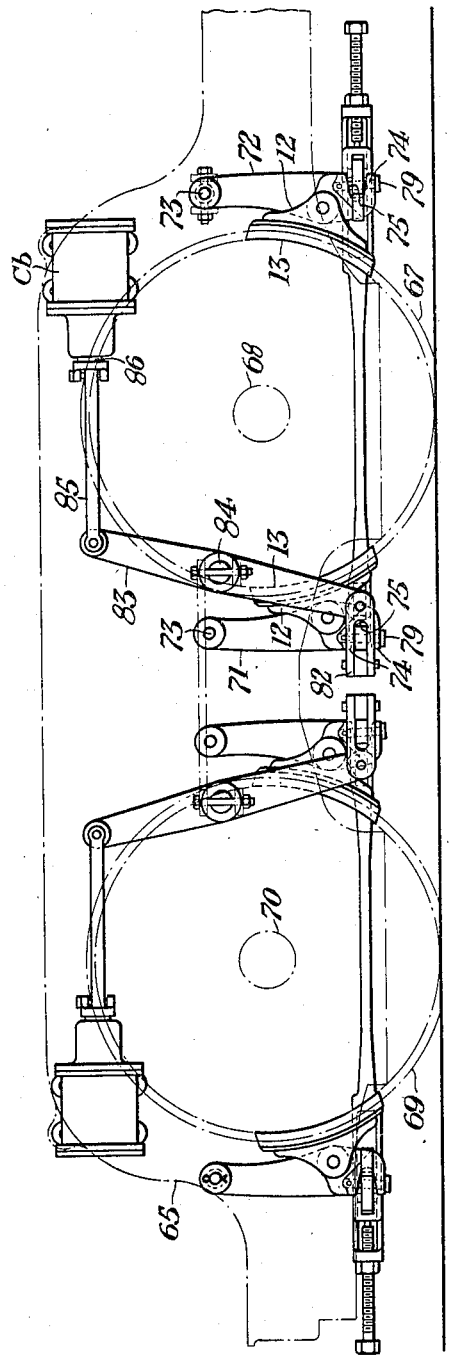

2,245,408

UNITED STATES PATENT OFFICE 2,245,408

BRAKE RIGGING

Thomas R. McGowan, Pittsburgh, Pa., assignor to The American Brake Company, Swissvale, Pa., a corporation of Missouri Original application May 25, 1938, Serial No. 209,936. Divided and this application January 5, 1940, Serial No. 312,557

2 Claims. (Cl. 188—56)

My invention relates to brake rigging for railway vehicles, and particularly to brake rigging for locomotives wherein brake shoes are applied to both sides of each wheel.

One object of my invention is to provide a brake rigging of the type described having a minimum number of operating parts, and having these parts so located with respect to the adjacent parts of the vehicle as to permit the proper movement of the various parts of the rigging without interference with or by the adjacent parts of the vehicle.

Another object of my invention is to provide a suitable form of brake rigging for applying clasp brakes to a trailer truck of a locomotive.

Other objects and characteristic features of my invention will appear as the description proceeds.

The present application is a division of my copending application, Serial No. 209,936, filed on May 25, 1938 for Brake rigging, now Patent No. 2,192,270, granted March 5, 1940.

I shall describe one form of brake rigging embodying my invention, and shall then point out the novel features thereof in claims.

In the accompanying drawing, Fig. 1 is a side elevational view showing brake rigging embodying my invention applied to a four trailer truck. Fig. 2 is a top plan view of the truck frame and brake rigging shown in Fig. 1, the usual hanger levers, brake heads and brake shoes being omitted to simplify and clarify the drawing.

Similar reference characters refer to similar parts in both views.

Referring to the drawing, the brake rigging here shown is applied to a four wheel trailer truck comprising spaced longitudinally extending side members 65 connected together by spaced transversely extending end members 66, only one side member being shown in the drawing. The truck frame is supported at its forward end by a wheel and axle assembly comprising a pair of wheels 67 mounted on an axle 68, and at its rear end by a wheel and axle assembly comprising a pair of wheels 69 mounted on an axle 70. The means for supporting the truck frame by the wheel and axle assemblies is not shown because these means are well-known and form no part of my present invention.

The brake rigging comprises four separate sets of mechanisms, one set of which is provided for each wheel. These mechanisms are similar and it is believed, therefore, that an understanding of the entire brake rigging will be had from a description of the mechanism which is associated with one only of the wheels.

Referring particularly to the mechanism associated with the one wheel 67, for example, this mechanism comprises two hanger levers 71 and 72 which are pivotally attached at their upper ends to the truck frame by means of pins 73, and each of which is provided intermediate its ends with a brake head 12 carrying a brake shoe 13 for braking engagement with the tread of the wheels 67. The lower end of each hanger lever is provided with jaws 74 which form a recess 75.

The mechanism associated with the wheel 67 also comprises two similar horizontal laterally extending levers 76 and 77 disposed at the forward and rear sides, respectively, of the wheel 67. The lever 76 is pivotally attached at its outer end to the side member 65 by means of a pin 78, and is operatively connected intermediate its ends with the hanger lever 72 within the recess 75 by means of a pin 79 which passes through registering openings formed in the lever 76 and in the jaws 74 of the lever 72.

The inner end of the lever 76 is operatively connected through the medium of a slack adjuster 80 of the usual and well-known construction, and a pull rod 81 with the inner end of the lever 77. The lever 77 is operatively connected intermediate its ends with the hanger lever 71 in the same manner that the lever 76 is operatively connected intermediate its ends with the hanger lever 72, and is operatively connected at its outer end through the medium of a double jaw 82 with the lower end of a vertically disposed brake cylinder lever 83.

The lever 83 is pivotally supported intermediate its ends on a pin 84 secured to the side member 65 of the truck, and is operatively connected at its upper end through the medium of a push rod 85 with the push rod 86 of a brake cylinder Cb. The brake cylinder Cb may be secured to the truck frame at any suitable location, but as here shown it is secured to the outer side of the side member 65 adjacent the upper end of the side member opposite the wheel 67. The brake cylinder is of the usual type, and includes the usual cylinder portion, return spring (not shown), and push rod 86 operated by the piston.

When it is desired to apply the brakes, fluid pressure is supplied to all four brake cylinders simultaneously and the fluid supplied to the cylinder Cb forces the piston of this cylinder outwardly toward the left, and this outward movement acts through the push rods 86 and 85, brake cylinder lever 83, and double jaw 82 to move the outer end of the lever 77 toward the right as viewed in Fig. 2. The movement of the lever 77 toward the right causes the hanger lever 71 to swing toward the wheel 67 to the position in which the associated brake shoe 13 moves into engagement with the wheel, whereupon the lever rotates in a counterclockwise direction about its point of connection with the hanger lever 71 in a manner to move the pull rod 81 toward the left as viewed in Fig. 1. The movement of the pull rod 81, in turn, causes the lever 76 to rotate in a counterclockwise direction as viewed in Fig. 1 about the pin 78, and thus moves the hanger lever 72 toward the wheel 67 to the position in which the associated brake shoe 13 engages the wheel. The release of the brakes is effected through the release springs located in the brake cylinder.

One advantage of brake rigging embodying my invention is that the brake mechanism is kept close to the frame and takes up a minimum amount of space.

Another advantage of this brake rigging is that it is of simple construction, is light in weight and requires a minimum number of different kinds of parts.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a brake rigging, the combination of a truck frame, a brake cylinder secured to said frame at the outer side of each wheel, a vertical brake cylinder lever associated with each brake cylinder and pivotally attached intermediate its ends to said truck frame and operatively connected at its upper end with the piston of the associated cylinder, a plurality of horizontal transversely extending levers one disposed on one side of each wheel and each operatively connected at its outer end with the lower end of the associated brake cylinder lever, a plurality of other horizontal transversely extending levers one disposed on the other side of each wheel and each pivotally attached at its outer end to the truck frame, a rod connecting the inner ends of the two levers associated with each wheel, and a brake element secured to each lever intermediate its ends and cooperating with the associated wheel to provide clasp brakes for the wheels.

2. In a brake rigging, the combination of a truck frame, a wheel, a brake cylinder secured to said truck frame outside of the plane of said wheel a little above said wheel, a vertical lever pivotally attached intermediate its ends to said truck frame and operatively connected at its upper end with said brake cylinder, two transversely extending horizontal levers disposed on opposite sides of said wheel, one of said levers being operatively connected at its outer end with the lower end of said brake cylinder lever and the other horizontal lever being fulcrumed at its outer end on said truck frame, a rod connecting said two horizontal levers at their inner ends, a pair of hanger levers disposed on opposite sides of said wheel and operatively connected with said horizontal levers intermediate their ends, and brake elements secured to said hanger levers and cooperating with the associated wheel.

THOMAS R. McGOWAN.